No. 795,063. PATENTED JULY 18, 1905.
H. J. REHORN.
CUSPIDOR.
APPLICATION FILED JUNE 28, 1904.

Witnesses:
H. H. Butler
E. E. Potter

Inventor
Henry J. Rehorn,
By N. C. Evert & Co.
Attorneys.

No. 795,063.

Patented July 18, 1905.

UNITED STATES PATENT OFFICE.

HENRY J. REHORN, OF HOMESTEAD, PENNSYLVANIA.

CUSPIDOR.

SPECIFICATION forming part of Letters Patent No. 795,063, dated July 18, 1905.

Application filed June 28, 1904. Serial No. 214,448.

*To all whom it may concern:*

Be it known that I, HENRY J. REHORN, a citizen of the United States of America, residing at Homestead, in the county of Allegheny and State of Pennsylvania, have invented certain new and useful Improvements in Cuspidors, of which the following is a specification, reference being had therein to the accompanying drawings.

This invention has relation to cuspidors, and more particularly to that class which are commonly known as "non-spillable" cuspidors; and the object of this invention is to provide a cuspidor of this character wherein means is employed to retain the contents of the cuspidor within the bowl in case the latter should become accidentally upset.

Another object of this invention is to provide a suitable mechanism contained within the bowl of the cuspidor which will only be operated upon the cuspidor being tilted or upset, the mechanism being adapted to close the inlet of the cuspidor and prevent the contents from being discharged from the same when it is accidentally upset.

Briefly described, my invention consists of employing the ordinary and well-known shape of cuspidor which comprises a bowl and a funnel-opening, and in the bowl of the cuspidor I provide a spring-actuated valve which will close the opening when the cuspidor is accidentally tilted or upset. In connection with the cuspidor I provide novel means for protecting the operating mechanism from the contents of the cuspidor, preventing the corrosion and rust of the different parts of the mechanism, whereby they would be rendered useless.

The invention finally consists in the novel construction, combination, and arrangement of parts, which will be hereinafter more fully described, and specifically pointed out in the claims, and in describing the invention in detail reference is had to the accompanying drawings, forming a part of this application, wherein like numerals of reference indicate similar parts throughout the several views, in which—

Figure 1:
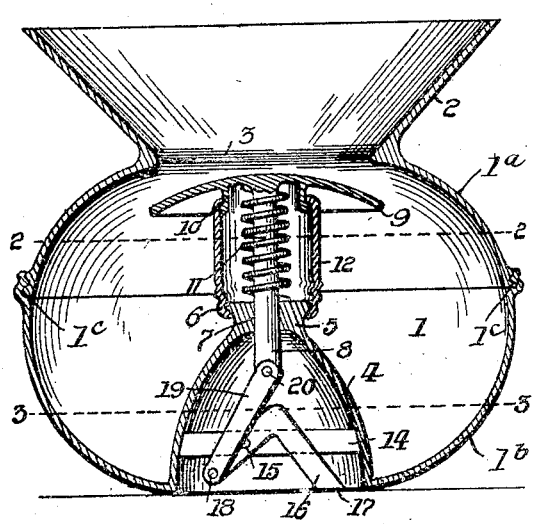
Figure 2:
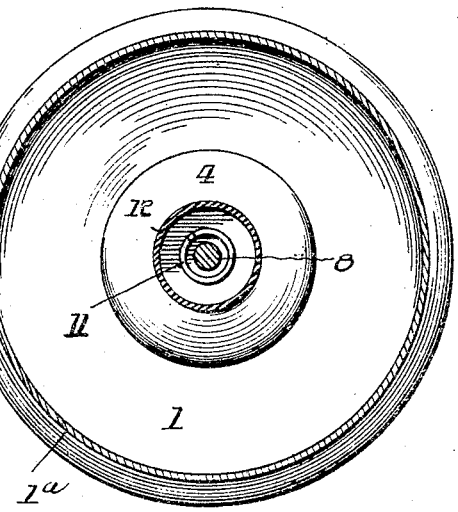
Figure 3:
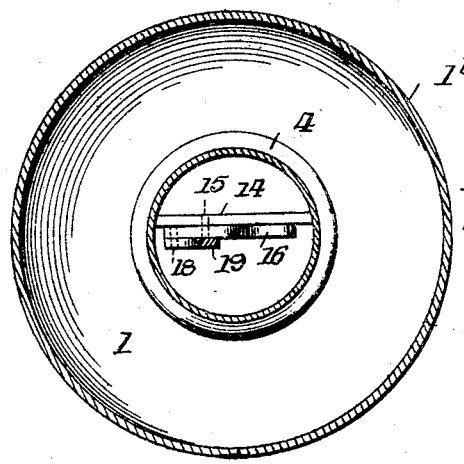
Figure 4:
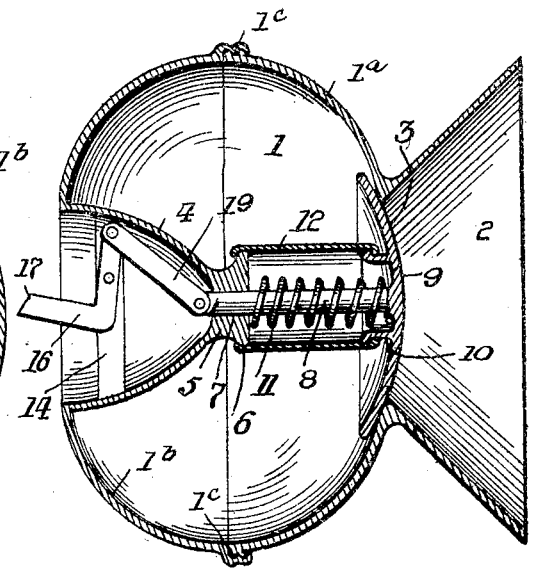

Figure 1 is a vertical sectional view of my improved cuspidor. Fig. 2 is a transverse sectional view taken on the line 2 2 of Fig. 1. Fig. 3 is a similar view taken on the line 3 3 of Fig. 1; and Fig. 4 is a vertical sectional view of my improved cuspidor, showing the same in an upset position.

To put my invention into practice, I provide a bowl 1, which may be made of any suitable material and of any desired form, though I preferably construct the same with a funnel portion 2, having an opening 3 formed therein, whereby the contents of the funnel will be admitted to the bowl. The bowl 1 is formed of two sections $1^a$ and $1^b$, secured together by the screw-threads $1^c$, and formed integral with the bottom of the section $1^b$ is a cup portion 4, having a boss 5 formed on its upper end, this boss being provided with an annular rim 6, and centrally of said boss is formed an aperture 7, through which a valve-stem 8 operates, this valve-stem on its upper end carrying an annular valve 9, which is semicylindrical and is provided with an annular depending flange 10. Interposed between the boss 5 and the valve 9 and surrounding the valve-stem 8 is a spiral spring 11, and secured upon the annular flange 10 and the rim of the boss 5 is a rubber tubing 12, this tubing being adapted to protect the spring from the contents of the cuspidor.

Mounted in the cup portion 4 is a cross-brace 14, to which is pivoted, as indicated at 15, an L-shaped lever 16, the end 17 of this lever being adapted to rest upon the floor or base which supports the cuspidor, and to the other end of the lever 16 is pivoted, as indicated at 18, a lever 19, which has its other end pivoted, as indicated at 20, to the lower end of the valve-stem 8.

In Fig. 1 of the drawings I have illustrated the cuspidor in its normal position, and in this position the weight of the cuspidor is sufficient to overcome the tension of the spring and hold the valve 9 in the position shown in Fig. 1 of the drawings. When in this position, the end 17 of the lever will rest upon the floor or the base upon which the cuspidor is supported and the spring will be normally held under tension, and when the cuspidor is tilted or upset, as shown in Fig. 4 of the drawings, or when the cuspidor assumes any position that the end 17 of the lever 16 will be permitted to leave the base upon which the cuspidor sets the spring 11 will expand, force the valve against the opening 3, closing the same and preventing the contents of the cuspidor from being discharged upon the floor or base on which the cuspidor rests. When the spring 11 expands, the rubber tubing 12 will simultaneously expand and protect the spring from the liquid or contents of the cuspidor. To return the valve and its appurtenant parts to their normal position, it is only necessary to place the cuspidor in its normal or upright position, at which time the weight of the same, bearing against the end 17 of the lever 16, will cause the lever which is pivoted at 15 to draw downwardly, through the medium of the lever 19, upon the valve-stem, disengaging the valve 9 from its seat and permitting any contents which may enter the funnel to pass through the opening 3 into the cuspidor.

While I have herein shown my improved cuspidor as being made of the ordinary and well-known form, it will of course be understood that the same may be made of any desired shape or configuration, and various changes may be made in the details without departing from the general spirit and scope of the invention.

What I claim is—

1. In a cuspidor, the combination with a bowl having an opening formed therein, a valve mounted in said bowl, means to force said valve in engagement with the opening of the bowl, a flexible tube connected to the valve and inclosing the first-named means, means for securing the sections of the bowl together, and means mounted in said bowl to normally hold said valve out of engagement with said opening.

2. In a cuspidor, the combination with a bowl having an opening formed therein, of a cup-shaped portion formed in said bowl, a valve operating through said cup portion, means interposed between said valve and the cup to force said valve in engagement with the opening of the bowl, means mounted within said cup to normally hold the valve out of engagement with said opening, and a flexible tube interposed between said valve and the cup-shaped portion and attached to both and inclosing the first-named means.

In testimony whereof I affix my signature in the presence of two witnesses.

HENRY J. REHORN.

Witnesses:
H. C. EVERT,
K. H. BUTLER.